Patented May 10, 1932

1,857,880

UNITED STATES PATENT OFFICE

ERWIN SCHWENK, OF BERLIN-NEU-WESTEND, AND HANS JORDAN, OF BERLIN-STEGLITZ, GERMANY, ASSIGNORS TO SCHERING-KAHLBAUM A. G., OF BERLIN, GERMANY

PRODUCTION OF HYDROAROMATIC-ALCOHOLS

No Drawing. Application filed January 3, 1931, Serial No. 506,488, and in Germany January 25, 1930.

Our invention refers to an improvement in the production of hydroaromatic alcohols.

As it is well known the mono- or polysubstituted phenols by treating with hydrogen in the presence of a hydrogenation catalyst are transformed into a mixture of cis-trans-isomeric hydroaromatic alcohols.

We have found that chiefly the trans-isomeric hydroaromatic alcohols can be obtained if not the free phenols but their alkali salts in aqueous or alcoholic solution are treated with hydogen in the presence of a hydrogenation catalyst. This is of great importance as the natural menthol is a trans-derivative. It is therefore possible by hydrogenation of an alkali metal salt of thymol to obtain the racemic menthol.

In the hydrogenation process a hydrogen pressure of 20–25 atm. will be sufficient, but there is no limit to higher pressures and also a pressure of 150 atm. can be applied. The limits of the temperature at which the reaction can be practised are between 150° and 250° C. As hydrogenation catalysts can be used the well known nickel catalysts or mixed catalysts consisting of nickel, cobalt, and copper, which may be precipitated on a carrier.

A particular feature of the process is that after the hydrogenation is performed the hydroaromatic alcohols which do not react with alkali to form salts, float above the alkali solution and can be separated by decantation. The remaining alkali solution can be used to dissolve new portions of the phenol to be hydrogenated.

*Example 1.*—A 30 per cent solution of 100 g. of the sodium salt of p-cresol in the presence of 5 g. of a nickel catalyst is treated with hydrogen under a pressure of about 25 atm. at 180–200° C. The hydrogen is quickly taken up. After cooling the trans-4-methyl-cyclohexanol which is floating above the sodium hydroxide solution is separated by decantation. The phenylurethane compound of the raw product melts at 115–117° C.

*Example 2.*—A 30 per cent solution of 100 g. thymol in an excess of caustic soda solution is treated in the presence of 5 g. of a hydrogenation catalyst at 190–210° C. with hydrogen under pressure. By working up according to Example 1 there is obtained trans-1-methyl-4-isopropyl-3-hydroxycyclohexanol (racemic menthol).

In the same manner also other aromatic hydroxyl-compounds as for instance naphthols, hydroxybenzoic acids, etc. can be hydrogenated to the corresponding trans-hydroaromatic compounds.

Various changes may be made in the details disclosed in the foregoing specification without departing from the invention or sacrificing the advantages thereof.

We claim:—

1. The process for the production of trans-hydroaromatic alcohols by treating alkali metal salts of alkyl substituted phenols with hydrogen in the presence of a hydrogenation catalyst at a temperature of 150° to 250° C.

2. The process for the production of trans-hydroaromatic alcohols by treating alkali metal salts of alkyl substituted phenols with hydrogen in the presence of a nickel catalyst at a temperature of 150–250° C.

3. The process for the production of trans-hydroaromatic alcohols by treating alkali metal salts of alkyl substituted phenols with hydrogen under pressure in the presence of a nickel catalyst at a temperature of 150–250° C.

4. The process for the production of the racemic menthol by treating an alkali metal salt of thymol with hydrogen in the presence of a hydrogenation catalyst.

5. The process for the production of the racemic menthol by treating an alkali metal salt of thymol with hydrogen in the presence of a nickel catalyst.

6. The process for the production of the racemic menthol by treating an alkali metal salt of thymol with hydrogen in the presence of a nickel catalyst at a temperature of 150–250° C.

7. The process for the production of the racemic menthol by treating an alkali metal salt of thymol with hydrogen under pressure in the presence of a nickel catalyst at a temperature of 150–250° C.

ERWIN SCHWENK.
HANS JORDAN.